(12) United States Patent
Merlin et al.

(10) Patent No.: US 9,693,300 B2
(45) Date of Patent: Jun. 27, 2017

(54) SYSTEM AND METHOD FOR SAVING POWER USING RESTRICTED ACCESS WINDOWS

(71) Applicant: QUALCOMM Incorporated, San Diego, CA (US)

(72) Inventors: Simone Merlin, San Diego, CA (US); George Cherian, San Diego, CA (US); Santosh Paul Abraham, San Diego, CA (US); Amin Jafarian, San Diego, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 13/958,187

(22) Filed: Aug. 2, 2013

(65) Prior Publication Data

US 2014/0146725 A1 May 29, 2014

Related U.S. Application Data

(60) Provisional application No. 61/731,407, filed on Nov. 29, 2012, provisional application No. 61/730,948, filed on Nov. 28, 2012.

(51) Int. Cl.
*H04W 4/00* (2009.01)
*H04W 52/02* (2009.01)
*H04W 72/04* (2009.01)

(52) U.S. Cl.
CPC ... *H04W 52/0206* (2013.01); *H04W 72/0446* (2013.01); *Y02B 60/50* (2013.01)

(58) Field of Classification Search
USPC .................. 370/311, 330, 333, 338
See application file for complete search history.

(56) References Cited

U.S. PATENT DOCUMENTS

| 6,438,375 | B1 | 8/2002 | Mueller |
| 2010/0246460 | A1 | 9/2010 | Kholaif et al. |
| 2012/0094660 | A1 | 4/2012 | Radulescu et al. |
| 2013/0095863 | A1 | 4/2013 | Dhanda et al. |
| 2013/0128798 | A1* | 5/2013 | Liu ........... H04W 48/12 370/312 |

(Continued)

FOREIGN PATENT DOCUMENTS

| TW | 200807962 A | 2/2008 |
| TW | 200830913 A | 7/2008 |

OTHER PUBLICATIONS

Ghosh C., "Restricted Access Window Signaling for Uplink Channel Access," doc.: IEEE 802.11-12/0843r0, Submission, Jul. 2012, Slide. 1-13.

(Continued)

*Primary Examiner* — Zewdu A Beyen
(74) *Attorney, Agent, or Firm* — Knobbe, Martens, Olson & Bear

(57) ABSTRACT

Systems and methods for wireless communication are disclosed. In one aspect an access point includes a processor configured to generate a message identifying a time period in which the access point will enter a power save mode and ignore a packet sent from any wireless station, and a transmitter connected to the processor and configured to transmit the message to one or more wireless stations associated with the access point.

26 Claims, 6 Drawing Sheets

(56) References Cited

U.S. PATENT DOCUMENTS

2013/0343305 A1* 12/2013 Kwon ............... H04W 72/0426
370/329
2014/0056163 A1* 2/2014 Kwon ................... H04W 24/10
370/252

OTHER PUBLICATIONS

Jafarian A., "Enabling AP Sleep," doc.: IEEE 11-13/0070r1, Submission, Jan. 2013, Slide. 1-11.
Taiwan Search Report—TW102142324—TIPO—Mar. 6, 2015.
Park; Minyoung: "TGah SFD D9.x; 11-12-0953-01-00ah-tgah-sfd-d9-x", IEEE SA Mentor; 11-12-0953-01-00AH-TGAH-SFD-D9-X, IEEE—SA Mentor, Piscataway, NJ USA, vol. 802.11ah, No. 1, Jul. 19, 2012 (Jul. 19, 2012), pp. 1-30, XP068039535, [retrieved on Jul. 19, 2012].
International Search Report and Written Opinion—PCT/US2013/068738—ISA/EPO—Feb. 10, 2014.
Seok, Yongho et al.: "Uplink Channel Access General Procedure; 11-12-0831-00-00ah-uplink-channel-access-general-procedure",
IEEE SA Mentor; 11-12-0831-00-00AH-Uplink-Channel-Access-General-Procedure, IEEE—SA Mentor, Piscataway, NJ USA, vol. 802.11ah, Jul. 16, 2012 (Jul. 16, 2012), pp. 1-19, XP068039355, [retrieved on Jul. 16, 2012].
European Search Report—EP16155890.3—Search Authority—The Hague—Jun. 1, 2016.

* cited by examiner

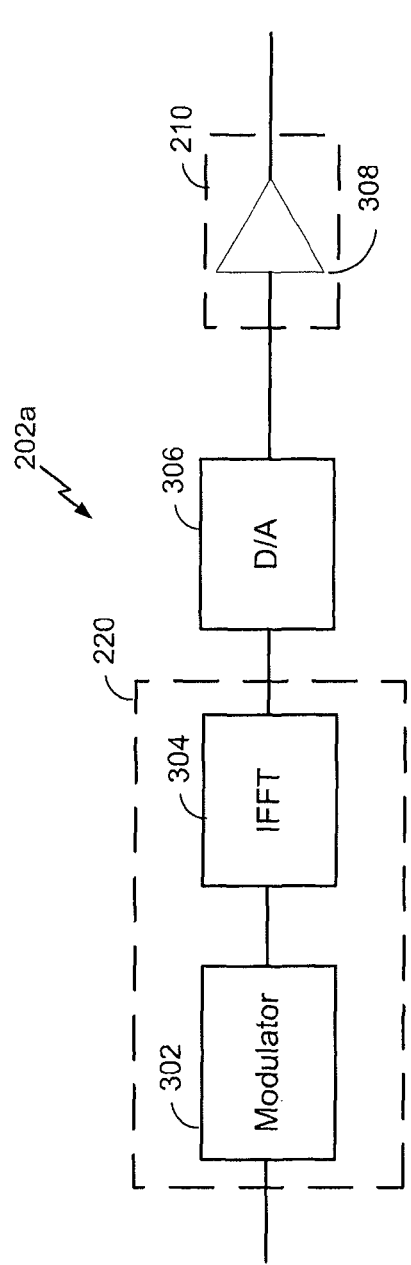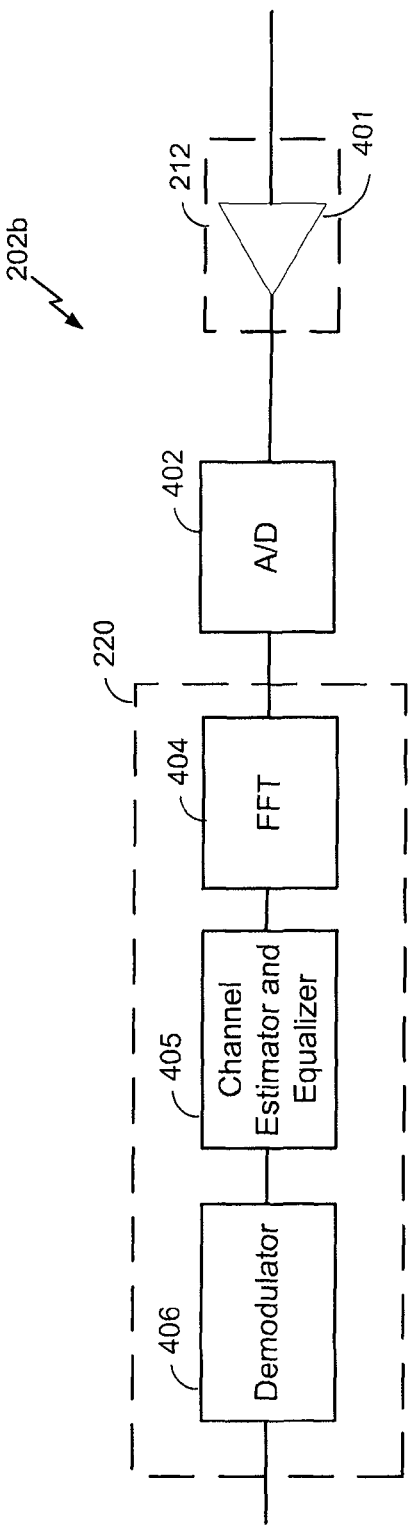

SYSTEM AND METHOD FOR SAVING POWER USING RESTRICTED ACCESS WINDOWS

CROSS REFERENCE TO RELATED APPLICATION(S)

This application claims the benefit of U.S. Provisional Application No. 61/730,948, entitled "System and Method for Saving Power Using Restricted Access Windows," filed Nov. 28, 2012, and U.S. Provisional Application No. 61/731, 407, entitled "System and Method for Saving Power Using Restricted Access Windows," filed Nov. 29, 2012.

BACKGROUND

Field

The present application relates generally to wireless communications, and more specifically to systems, methods, and devices for saving power using restricted access windows.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow sleep time for an access point.

One aspect of the disclosure provides an access point. The access point includes a processor configured to generate a message identifying a time period in which the access point will ignore a packet from any wireless station, and a transmitter connected to the processor and configured to transmit the message to one or more wireless stations associated with the access point.

Another aspect of the disclosure provides a method of wireless communication. The method includes generating, at an access point, a message identifying a time period in which the access point will ignore a packet from any wireless station. The method further includes transmitting the message from the access point to one or more wireless stations associated with the access point.

Another aspect of the disclosure provides an access point. The access point includes means for generating a message identifying a time period in which the access point will ignore a packet from any wireless station. The access point further includes means for transmitting the message to one or more wireless stations associated with the access point.

Another aspect of the disclosure provides a non-transitory physical computer storage including computer executable instructions configured to implement a method for wireless communication by a station. The method includes generating, at an access point, a message identifying a time period in which the access point will ignore a packet from any wireless station. The method further includes transmitting the message from the access point to one or more wireless stations associated with the access point.

Another aspect of the disclosure provides a wireless station. The station includes a receiver configured to receive a message from an access point identifying a time period in which the access point will ignore a packet from any wireless station, and a processor connected to the receiver and configured to refrain from transmitting a packet to the access point during the identified time period.

Another aspect of the disclosure provides a method of wireless communication. The method includes receiving, at a wireless station, a message from an access point identifying a time period in which the access point will ignore a packet from any wireless station. The method further includes refraining, at the wireless station, from transmitting a packet to the access point during the identified time period.

Another aspect of the disclosure provides a wireless station. The station includes means for receiving a message from an access point identifying a time period in which the access point will ignore a packet from any wireless station. The station further includes means for refraining from transmitting a packet to the access point during the identified time period.

Another aspect of the disclosure provides a non-transitory physical computer storage including computer executable instructions configured to implement a method for wireless communication by a station. The method includes receiving, at a wireless station, a message from an access point identifying a time period in which the access point will ignore a packet from any wireless station. The method further includes refraining, at the wireless station, from transmitting a packet to the access point during the identified time period.

BRIEF DESCRIPTION OF THE DRAWINGS

FIG. 3 illustrates an example of components that may be included within the wireless device of FIG. 2 to transmit wireless communications.

FIG. 4 illustrates an example of components that may be included within the wireless device of FIG. 2 to transmit wireless communications.

DETAILED DESCRIPTION

Figure 1:
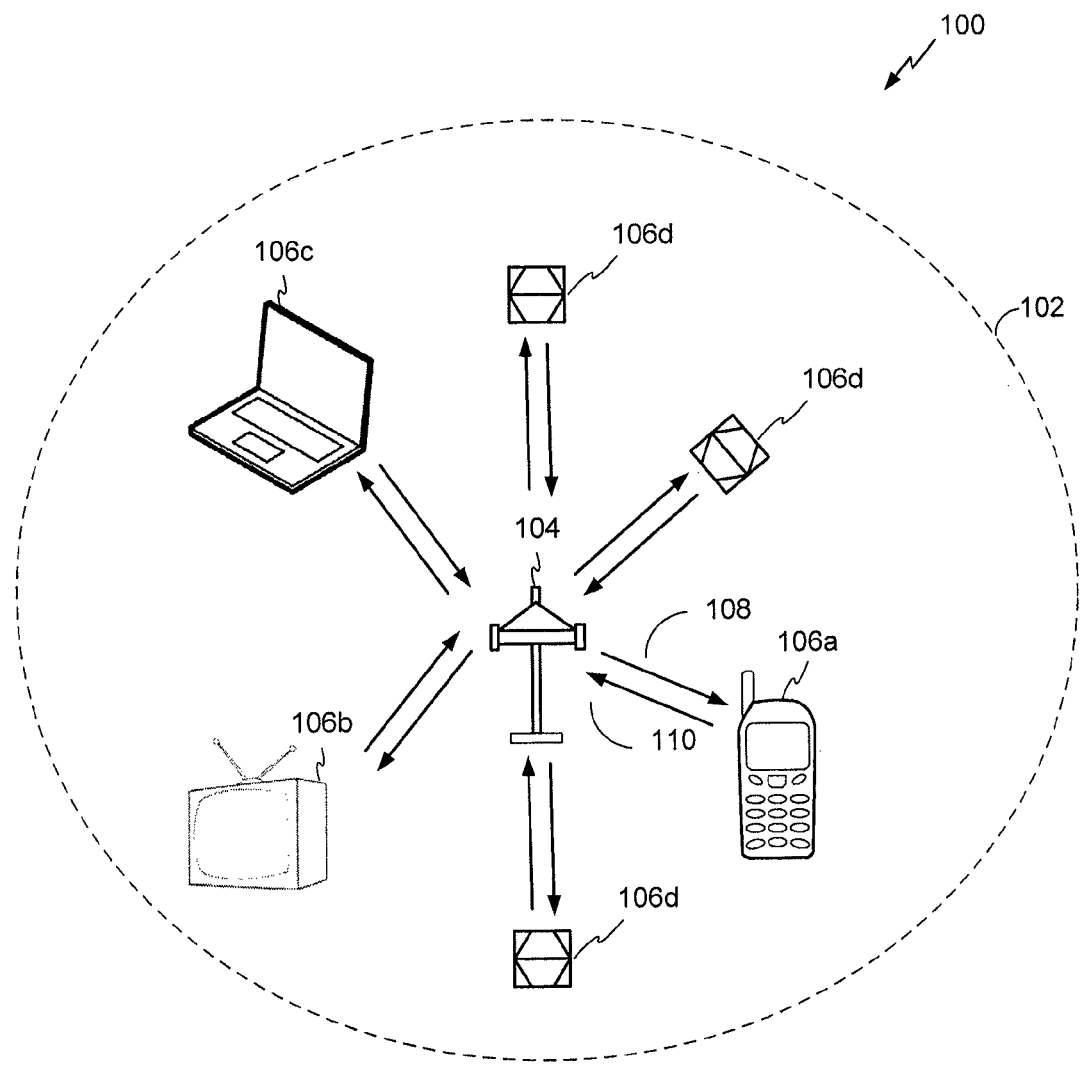
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11 ah protocol may be used for sensors, metering, and smart grid networks. Advantageously, aspects of certain devices implementing the 802.11 ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology. The access point may be a main or relay base station. A relay base station relays data between wireless stations and another base station, being the main base station or another relay base station.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11 ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few.

Figure 2:
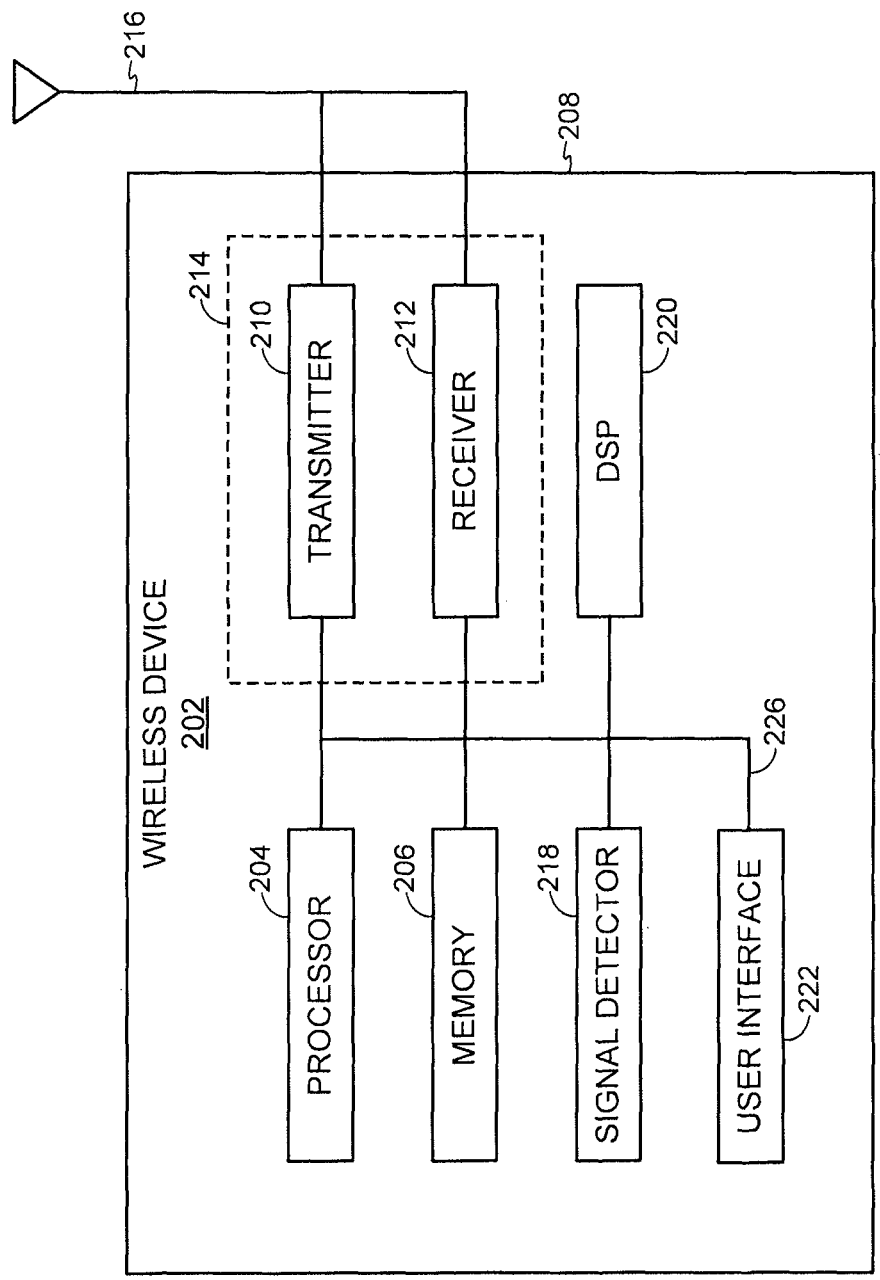
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or a STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units with training fields with peak-to-power average ratio is as low as possible, as will be discussed in additional detail below. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmission processor.

The analog signal may be wirelessly transmitted by the transmitter 210. The analog signal may be further processed before being transmitted by the transmitter 210, for example by being filtered or by being upconverted to an intermediate or carrier frequency. In the implementation illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets, frames, or data units in a wireless signal based on the analog signal. The data units may be generated using the processor 204 and/or the DSP 220, for example using the modulator 302 and the transform module 304 as discussed above.

FIG. 4 illustrates various components that may be utilized in the wireless device 202 to receive wireless communications. The components illustrated in FIG. 4 may be used, for example, to receive OFDM communications. In some implementations, the components illustrated in FIG. 4 are used to receive packets, frames, or data units that include one or more training fields, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets, frames, or data units in a wireless signal.

In the implementation illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet, frame, or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

In wireless communications such as those specified in the IEEE 802.11 family of wireless protocols, multiple stations share a transmission medium using a media access control protocol. A beacon frame, which is one of management and control frames that support data transfer, may be used to establish and maintain the communications in an orderly fashion. In some applications such as those specified in the 802.11ah protocol, a restricted access window may be used to define a period of time that an access point declares as reserved for a selected group of wireless stations. However, the restricted access window does not provide sleep time for the access point. Thus, it is beneficial to have a message defining a time period in which the access point will ignore, fail to consider, or otherwise not accept a package from any wireless stations, in order to enable power save at the access point. As used herein, the term "ignore" will be employed to describe the absence of action on the part of the AP during the "sleep" or power save time designated by such a message, as opposed to an active refusal to reply or consider an incoming packet, PPDU, or other data message.

In implementations as will be described below, an access point (AP) generates a message identifying a time period in which the access point will ignore a packet from any wireless station and sends the message to the associated wireless stations. Upon receipt of the message, the wireless stations refrain from transmitting a packet to the access point during the identified time period. In one implementation, the message is sent to all the wireless stations associated with the access point. These implementations may be applied in processes and standards associated with IEEE 802.11 and/or 802.11ah among others.

Figure 5:
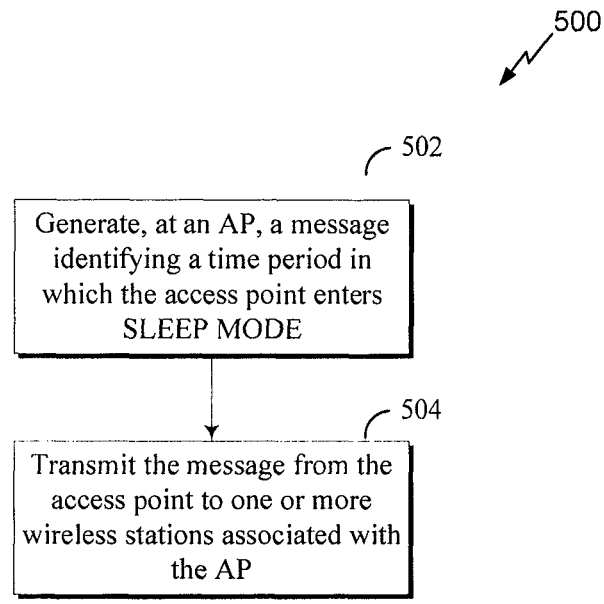
FIG. 5 is a flowchart of a method of wireless communication in accordance with one implementation.

FIG. 5 is a flowchart of a method of wireless communication in accordance with one implementation. The method 500 may be performed by an apparatus for wireless communication, such as the access point (AP) 104 (shown in FIG. 1). At block 502, the method includes generating, at an access point, a message identifying a time period in which the access point will ignore a packet from any wireless station. In one implementation, the message identifies a time period in which the access point will ignore a data packet from any wireless station. The message may be sent as a part of a beacon frame, which is a management and control frame used to establish and maintain the communications in an orderly fashion. The message may be generated by, for example, the processor 204 (shown in FIG. 2). Moving to block 504, the method includes transmitting the message from the access point to one or more wireless stations associated with the access point. The message may be transmitted by, for example, the transmitter 210 (shown in FIG. 2). The method 500 thus allows the AP to designate a sleep time. Some implementations of the sleep time may comprise a period in which the receiving circuitry, such as receiver 212, is powered down or otherwise disabled to enable the access point to enter a power save mode. In other implementations, the AP may alternatively be commanded to actively ignore incoming packets from a group of wireless stations.

Figure 6:
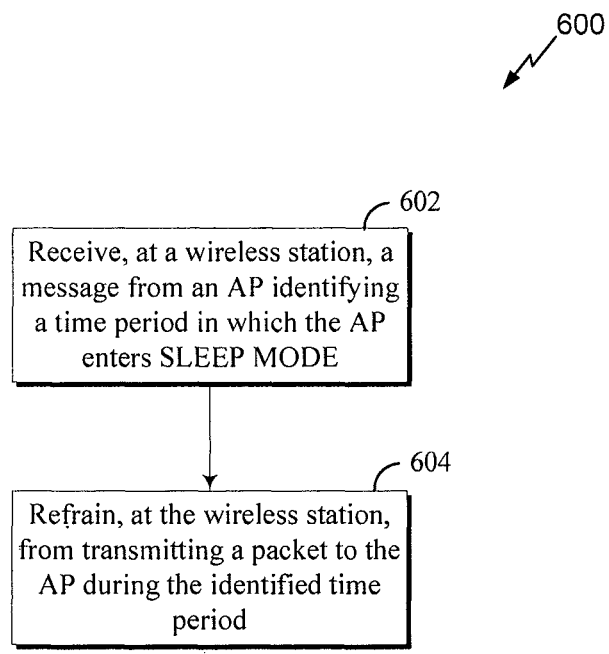
FIG. 6 is a flowchart of a method of wireless communication in accordance with one implementation.

FIG. 6 is a flowchart of a method of wireless communication in accordance with one implementation. The method 600 may be performed by an apparatus for wireless communication, such as the station 106 (shown in FIG. 1). At block 602, the method includes receiving, at a wireless station, a message from an access point identifying a time period in which the access point will enter sleep mode and ignore a packet or any PPDUs from any wireless station. The message may be the message transmitted by an access point as described above with regard to FIG. 5. The message may be received by, for example, the receiver 212 (shown in FIG. 2). Moving to block 604, the method includes refraining, at the wireless station, from transmitting a packet to the access point during the time period identified by the message from the access point. Block 604 may be performed by, for example, the processor 204 (shown in FIG. 2).

Figure 7:
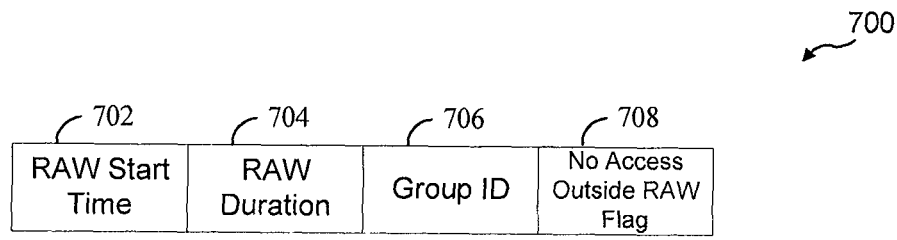
FIG. 7 shows one implementation of the message identifying sleep time for the access point.

The message identifying sleep time for the access point may be composed in various ways. FIG. 7 shows one implementation of the message identifying sleep time for the access point. The message 700 may be transmitted from an AP to associated wireless stations as described above with regard to FIG. 5. The message 700 may be transmitted using any process and method suitable for transmissions from the AP to the station.

In the illustrative implementation, the message defines a restricted access window, a period of time that an access point declares as reserved for a selected group of wireless stations, such as one specified in the 802.11 ah protocol. The message includes a RAW Start Time 702 indicating the start time of the restricted access window. The message also includes a RAW Duration 704 indicating the duration of the restricted access window. The message also includes a Group ID 706 listing the selected group of wireless stations allowed to send a packet to the access point during the restricted access window.

In addition, the message includes a flag 708 for indicating that no wireless station is allowed to send a packet to the access point outside a restricted access window. The flag 708 may include one bit which can be set to a logic value of 0 or 1, wherein a logic value of 1 indicates that no wireless station is allowed to send a packet to the access point outside a restricted access window. By defining a restricted access window and indicating that no access is allowed outside the restricted access window, the message 700 thus defines any time outside the specified restricted access window as a sleep time for the access point, lowering the access point power consumption. In one implementation, the flag 708 may additionally indicate that the access point will not send any packet outside the restricted access window. This informs the wireless stations that both uplink and downlink communications are not possible outside the restricted access window, allowing the stations to go to sleep mode.

Alternatively, the flag 708 may be defined as indicating that the access point will ignore any packets from the selected group of wireless stations identified by the Group ID 706.

Figure 8:
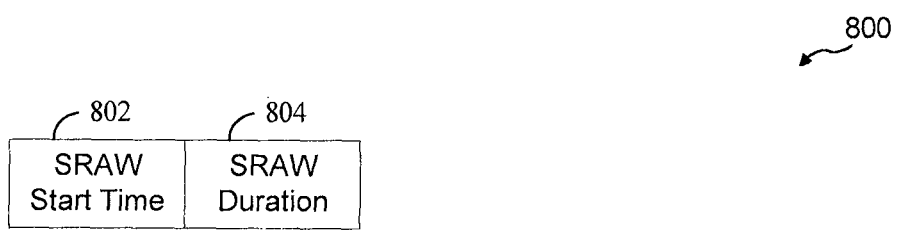
FIG. 8 shows another implementation of the message identifying sleep time for the access point.

FIG. 8 shows another implementation of the message identifying sleep time for the access point. In the illustrative implementation, the message 800 specifies a special type of restricted access window, which is defined as a period of time that an access point declares that no wireless access station is allowed to send a packet to the access point. The message 800 thus includes a SRAW start time 802 indicating the start time of the SRAW and a SRAW Duration 804 indicating the duration of the SRAW. Such a message 800 may alternatively indicate an access point sleep time, during which no packets will be accepted in order to minimize power consumption.

Figure 9:
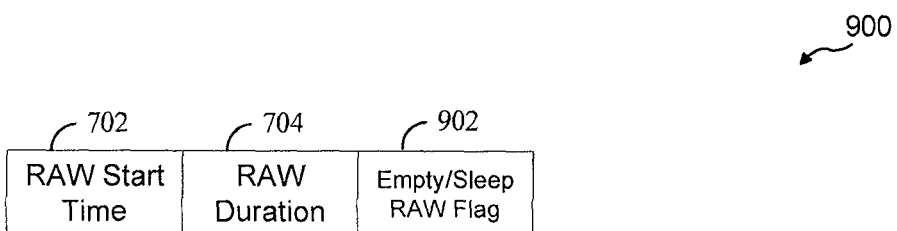
FIG. 9 shows another implementation of the message identifying sleep time for the access point.

FIG. 9 shows another implementation of the message identifying sleep time for the access point. In the illustrative implementation, the message defines a restricted access window, a period of time that an access point declares as reserved for a selected group or sector of wireless stations, such as one specified in the 802.11ah protocol. The message includes a RAW Start Time 702 indicating the start time of the restricted access window and a RAW Duration 704 indicating the duration of the restricted access window.

In addition, the message includes a flag 902 for indicating that the selected group is an empty group. The flag 902 may include one bit which can be set to a logic value of 0 or 1, wherein a logic value of 1 indicates that the selected group is an empty group. By defining a restricted access window and indicating that the selected group for restricted access is empty, the message 900 thus defines a time window as a sleep time for the access point. In one implementation, the flag 902 may additionally indicate that the access point will not send any packet outside the restricted access window. This informs the wireless stations that both uplink and downlink communications are not possible outside the restricted access window, allowing the stations to go to sleep mode as well.

Figure 10:
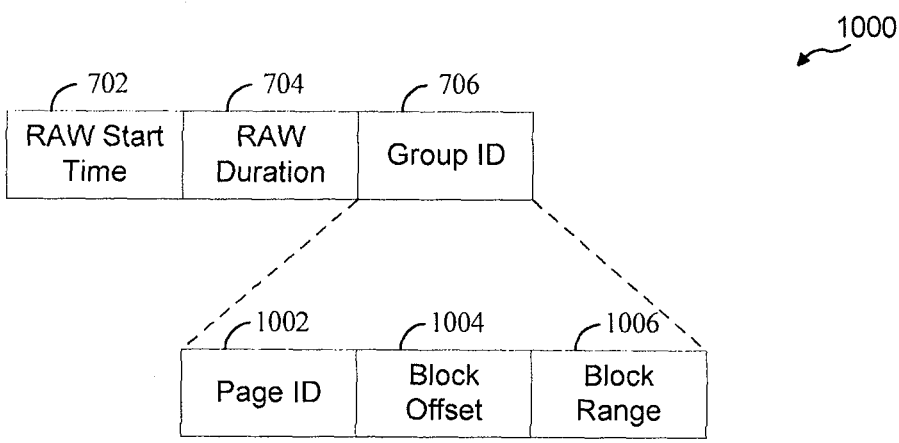
FIG. 10 shows another implementation of the message identifying sleep time for the access point.

FIG. 10 shows another implementation of the message identifying sleep time for the access point. In the illustrative implementation, the message 1000 defines a restricted access window, a period of time that an access point declares as reserved for a selected group of wireless stations, such as one specified in the 802.11ah protocol. The message includes a RAW Start Time 702 indicating the start time of the restricted access window, a RAW Duration 704 indicating the duration of the restricted access window, and a Group ID 706 listing the selected group of wireless stations allowed to send a packet to the access point during the restricted access window. The access point may set values to the Group ID 706 such that the selected group does not include any wireless stations. In other words, the Group ID 706 identifies an empty group as the selected group. By defining a restricted access window and assigning no wireless station to the selected group for restricted access, the message 1000 thus defines a time window a sleep time for the access point.

In one implementation, the Group ID 706 may include at least three portions as defined in the 802.11 ah protocol. The first portion 1002 includes a Page ID indicating the page index for hierarchical association identification (AID) of the selected group of wireless stations. The second portion 1004 includes a Block Offset indicating the starting block index of the selected group. The third portion 1006 includes a Block Range indicating the number of blocks for the selected group starting from the block offset. In one implementation, it may be defined that a value of 0 in all the three portions 1002, 1004 and 1006 indicates that the selected group of wireless stations is empty. Alternatively, it may be defined that any combinations assigned to the three portions, which will not result in a valid AID, may indicate that the selected group of wireless stations is empty. In one implementation, such combinations, which will not result in a valid AID may be, for example, any fixed number between 6000 and 2^13.

The message illustrated above with regard to FIGS. 7-10 each lists the duration of the restricted access window. In some implementations, the message may replace a field indicating fixed duration with a field indicating a minimum or maximum reserved time.

Figure 11:
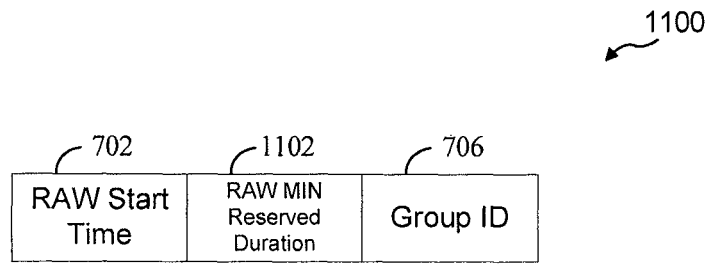
FIG. 11 shows one implementation of the message identifying a minimum reserved time for the access window.

FIG. 11 shows one implementation of the message identifying a minimum reserved time for the access window. In the illustrative implementation, the message 1100 includes a minimum reserved duration indicating the minimum reserved time for the restricted access window. The message 1100 thus granted access to the access point to a selected group of wireless stations for the minimum reserved time. If any wireless station in the selected group wants to send data that exceeds the minimum reserved time as identified in the message, the wireless station may send a request to the access point to extend the active duration of the restricted access window. For example, the wireless station may send a packet with a More Data flag set to a logic value of 1, indicating that the station has more data to send. In response, the access point could send a message indicating that the restricted access window is extended by a given amount of time.

Figure 12:
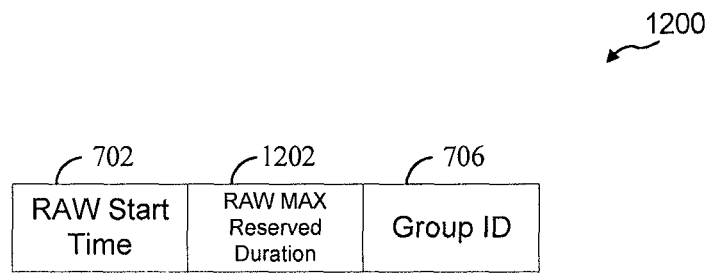
FIG. 12 shows one implementation of the message identifying a maximum reserved time for the access window.

FIG. 12 shows one implementation of the message identifying a maximum reserved time for the access window. In the illustrative implementation, the message 1200 includes a maximum reserved duration indicating the maximum reserved time for the restricted access window. The message 1200 thus granted access to the access point to a selected group of wireless stations for the maximum reserved time. If the access point has knowledge that all of the selected group of wireless stations are asleep before the maximum reserved time is reached, the access point may send a message indicating that the restricted access window is terminated earlier than the maximum reserved time. As a result, the access point may switch to a sleep mode during the remainder of the maximum reserved time.

In some of the foregoing implementations, a message from an access point specifies a restricted access window, a period of time that the access point declares as reserved for a selected group of wireless stations, such as one specified in the 802.11ah protocol. Alternatively, the message may specify an access window during which access to the medium is granted to all wireless stations. In other words, the access point will accept a packet from all wireless stations during the access window. In one implementation, the message may further include a flag for indicating no access outside the access window, such as the flag 708 (see FIG. 7). This allows an access point to define active and inactive periods of time for the access point.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An access point comprising:
a processor configured to generate a message identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and
a transmitter connected to the processor and configured to transmit the message identifying the restricted access window reserved for the selected group of wireless stations to one or more wireless stations associated with the access point.

2. The access point of claim 1, wherein the access point is configured to be associated with a plurality of wireless stations, and wherein the transmitter is configured to transmit the message to the plurality of wireless stations.

3. The access point of claim 1, further comprising the message including a minimum reserved time for the restricted access window, wherein the transmitter is further configured to, in response to a request from a wireless station to extend the restricted access window beyond the minimum reserved time, transmit a message indicating that the restricted access window is extended by a particular amount of time.

4. The access point of claim 1, further comprising the message including a maximum reserved time for the restricted access window, wherein the transmitter is further configured to, upon detecting that all wireless stations in the selected group are asleep before the maximum reserved time is reached, transmit a message indicating that the restricted access window is terminated.

5. The access point of claim 1, further comprising the restricted access window indicating that the access point will ignore any packet during the restricted access window.

6. The access point of claim 1, further comprising the restricted access window being defined by three fields, the three fields including a page identification field indicating a page index for hierarchical association identification (AID) of the selected group, a block offset field indicating a starting block index of the selected group, and a block range field indicating a number of blocks for the selected group, wherein the message indicates that the selected group is empty by assigning a value of 0 to the page identification field, the block offset field, and the block range field, or by assigning any combinations of values to the three fields that will not result in a valid AID.

7. A method of wireless communication, comprising:
generating, at an access point, a message identifying a restricted access window that the access point declares as reserved for a selected group of wireless stations, the message further including a bit flag in association with the identified restricted access window, wherein the bit flag is set to a predetermined value that indicates that the selected group of wireless stations that the restricted access window is reserved for is an empty group, and the message further indicating that the access point will ignore packets from any wireless station during the restricted access window; and
transmitting the message identifying the restricted access window reserved for the selected group of wireless stations from the access point to one or more wireless stations associated with the access point.

8. The method of claim 7, further comprising associating the access point with a plurality of wireless stations, wherein the message is transmitted to the plurality of wireless stations.

9. The method of claim 7, further comprising the message including a minimum reserved time for the restricted access window, further comprising:
receiving a request from a wireless station to extend the restricted access window beyond the minimum reserved time; and
transmitting a message from the access point to the wireless station indicating that the restricted access window is extended by a particular amount of time.

10. The method of claim 7, further comprising the message including a maximum reserved time for the restricted access window, the method further comprising:
upon detecting that all wireless stations in the selected group are asleep before the maximum reserved time is reached, transmitting a message indicating that the restricted access window is terminated.

11. The method of claim 7, wherein the restricted access window indicates that the access point will ignore any packet during the restricted access window.

12. The method of claim 7, further comprising the restricted access window being defined by three fields, the three fields including a page identification field indicating a page index for hierarchical association identification (AID) of the selected group, a block offset field indicating a starting block index of the selected group, and a block range field indicating number of blocks for the selected group, wherein the message indicates that the selected group is empty by assigning a value of 0 to the page identification field, the block offset field, and the block range field, or by assigning any combinations of values to the three fields that will not result in a valid AID.

13. An access point, comprising:
means for generating a message identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and
means for transmitting the message identifying the restricted access window reserved for the selected group of wireless stations to one or more wireless stations associated with the access point.

14. A non-transitory computer readable storage medium comprising computer executable instructions configured to implement a method for wireless communication by a station, the method comprising:
generating, at an access point, a message identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and
transmitting the message identifying the restricted access window reserved for the selected group of wireless stations from the access point to one or more wireless stations associated with the access point.

15. A wireless station comprising:
a receiver configured to receive a message from an access point identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and
a processor connected to the receiver and configured to refrain from transmitting a packet to the access point during the identified time period.

16. The wireless station of claim 15, further comprising the message further including a minimum reserved time for the restricted access window, wherein the processor is further configured to transmit a request to the access point to extend the restricted access window beyond the minimum reserved time.

17. The wireless station of claim 15, further comprising the message further including a maximum reserved time for the restricted access window, wherein the receiver is further configured to receive a message from the access point indicating that the restricted access window is terminated.

18. The wireless station of claim 15, wherein the restricted access window indicates that the access point will ignore any packet during the restricted access window.

19. The wireless station of claim 15, further comprising the restricted access window being defined by three fields, the three fields including a page identification field indicating a page index for hierarchical association identification (AID) of the selected group, a block offset field indicating a starting block index of the selected group, and a block range field indicating number of blocks for the selected group, wherein the message indicates that the selected group is empty by assigning a value of 0 to the page identification field, the block offset field, and the block range field, or by assigning any combinations of values to the three fields that will not result in a valid AID.

20. A method of wireless communication, comprising:
receiving, at a wireless station, a message from an access point identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and
refraining, at the wireless station, from transmitting a packet to the access point during the identified time period.

21. The method of claim 20, further comprising the message including a minimum reserved time for the restricted access window, the method further comprising transmitting a request from the wireless station to the access point to extend the restricted access window beyond the minimum reserved time.

22. The wireless station of claim 20, further comprising the message including a maximum reserved time for the restricted access window, further comprising receiving, at the wireless station, a message from the access point indicating that the restricted access window is terminated.

23. The method of claim 20, wherein the restricted access window indicates that the access point will ignore any packet during the restricted access window.

24. The method of claim 20, further comprising the restricted access window being defined by three fields, the three fields including a page identification field indicating a page index for hierarchical association identification (AID) of the selected group, a block offset field indicating a starting block index of the selected group, and a block range field indicating number of blocks for the selected group, wherein the message indicates that the selected group is empty by assigning a value of 0 to the page identification field, the block offset field, and the block range field, or by assigning any combinations of values to the three fields that will not result in a valid AID.

25. A wireless station, comprising:
means for receiving a message from an access point identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and means for refraining from transmitting a packet to the access point during the identified time period.

26. A non-transitory physical computer storage comprising computer executable instructions configured to implement a method for wireless communication by a station, the method comprising:

receiving, at a wireless station, a message from an access point identifying a restricted access window that the access point declares as reserved for a selected group of wireless stations, the message further including a bit flag in association with the restricted access window, wherein the bit flag is set to a predetermined value that indicates that the selected group of wireless stations that the restricted access window is reserved for is an empty group, and the message further indicating that the access point will ignore packets from any wireless station during the restricted access window; and refraining, at the wireless station, from transmitting a packet to the access point during the identified time period.

* * * * *